(12) United States Patent
Wu (10) Patent No.: US 9,823,487 B2
(45) Date of Patent: Nov. 21, 2017

(54) LENS ASSEMBLY AND TEST APPARATUS

(71) Applicant: MiiCs & Partners (Shenzen) Co., Ltd., Shenzhen (CN)

(72) Inventor: Cheng-Shiun Wu, New Taipei (TW)

(73) Assignee: MiiCs & Partners (Shenzhen) Co., Ltd., Shenzhen (CN)

( * ) Notice: Subject to any disclaimer, the term of this patent is extended or adjusted under 35 U.S.C. 154(b) by 218 days.

(21) Appl. No.: 14/834,600

(22) Filed: Aug. 25, 2015

(65) Prior Publication Data
US 2016/0349527 A1    Dec. 1, 2016

(30) Foreign Application Priority Data

May 27, 2015   (TW) .............................. 104117072 A (51) Int. Cl.
*G02B 27/62*   (2006.01)
*G02B 7/02*    (2006.01)

(52) U.S. Cl.
CPC ............ *G02B 27/62* (2013.01); *G02B 7/025* (2013.01)

(58) Field of Classification Search
CPC ........ G02B 27/62; G02B 7/025; G02B 7/021; G02B 7/023; Y10T 29/49764; Y10T 29/49769; Y10T 29/49771; Y10T 29/49778; Y10T 29/4978; Y10T 29/49998; G01M 11/0221; G06Q 50/04
USPC .... 29/407.05, 407.09, 407.1, 464, 465, 525, 29/702, 703, 709, 714, 720, 559, 721, 29/281.1
See application file for complete search history.

(56) References Cited

U.S. PATENT DOCUMENTS

| | | | | |
|---|---|---|---|---|
| 5,680,694 A | * | 10/1997 | Best | B23P 21/004 29/701 |
| 6,983,533 B2 | * | 1/2006 | Wisecarver | G02B 7/023 100/289 |
| 8,000,044 B2 | * | 8/2011 | Ono | G02B 7/026 359/823 |
| 9,612,450 B2 | * | 4/2017 | Nagayama | G02B 7/023 |
| 2002/0034921 A1 | * | 3/2002 | Mizuno | B24B 9/14 451/5 |
| 2009/0103109 A1 | * | 4/2009 | Spalding | G01B 11/27 356/625 |
| 2010/0110571 A1 | * | 5/2010 | Ono | G02B 7/026 359/824 |

(Continued)

*Primary Examiner* — Ryan J Walters
*Assistant Examiner* — Lawrence Averick
(74) *Attorney, Agent, or Firm* — ScienBiziP, P.C.

(57) ABSTRACT

A lens assembly and test apparatus includes a bearing tray, a controller, a lens eccentricity detection system, a lens assembly device, a dispensing device and a resolution detection device. The bearing tray includes a mechanical arm. The lens eccentricity detection system, the lens assembly device, the dispensing device and the resolution detection device are arranged along the edge of the bearing tray. The controller is configured to control the bearing tray and the mechanical arm, and make the mechanical arm grab an optic lens and arrange the optic lens in the lens eccentricity detection system, and the lens assembly device in sequence. The lens eccentricity detection system is configured to detect the optic lens. The lens assembly device is configured to assemble the optic lens into a lens barrel to form a lens module. The dispensing device is configured to cement the lens module.

8 Claims, 7 Drawing Sheets

(56) References Cited

U.S. PATENT DOCUMENTS

| | | | | |
|---|---|---|---|---|
| 2010/0142347 A1* | 6/2010 | Kuo | ............ | G03B 43/00 369/53.2 |
| 2015/0192750 A1* | 7/2015 | Shiraishi | ............ | G02B 7/02 29/593 |
| 2016/0182787 A1* | 6/2016 | Sesti | ............ | G02B 7/025 156/64 |
| 2016/0282453 A1* | 9/2016 | Pennecot | ............ | G01S 7/4972 |

* cited by examiner

LENS ASSEMBLY AND TEST APPARATUS

FIELD

The subject matter herein generally relates to an assembly and test apparatus, and particularly relates to a lens assembly and test apparatus.

BACKGROUND

A lens assembly line usually includes an assembly station, a glue dispensing station, and a testing station separated from each other. Components of a lens module must be loaded and unloaded many times at different station, which increases the cost of the lens module.

BRIEF DESCRIPTION OF THE DRAWINGS

Implementations of the present technology will now be described, by way of example only, with reference to the attached figures.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "substantially" is defined to be essentially conforming to the particular dimension, shape or other word that substantially modifies, such that the component need not be exact. For example, substantially cylindrical means that the object resembles a cylinder, but can have one or more deviations from a true cylinder. The term "comprising," when utilized, means "including, but not necessarily limited to"; it specifically indicates open-ended inclusion or membership in the so-described combination, group, series and the like.

The present disclosure is described in relation to a lens assembly and test apparatus.

Figure 1:
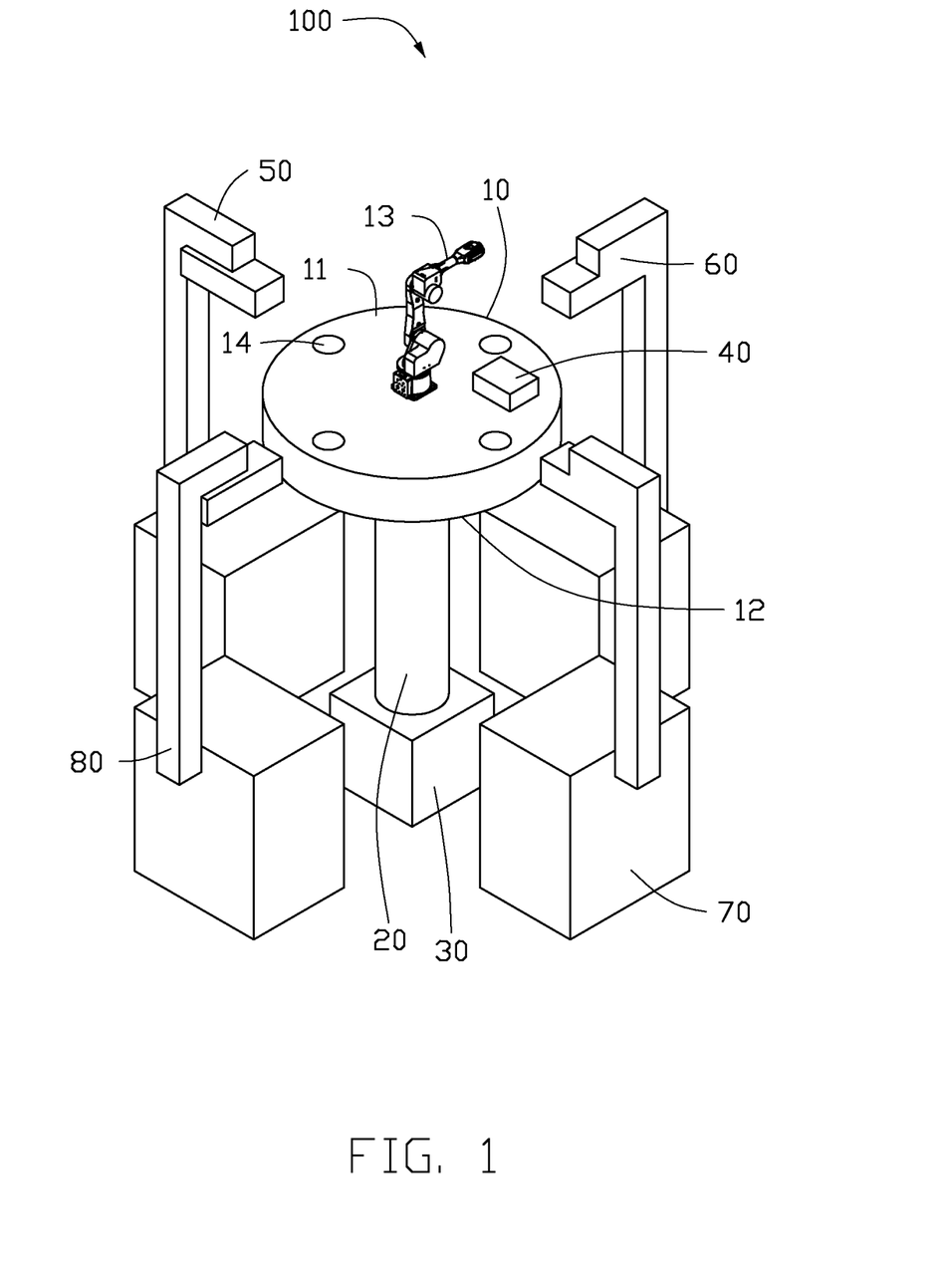
FIG. 1 is a diagrammatic view of an embodiment of a lens assembly and test apparatus of the disclosure.
Figure 2:
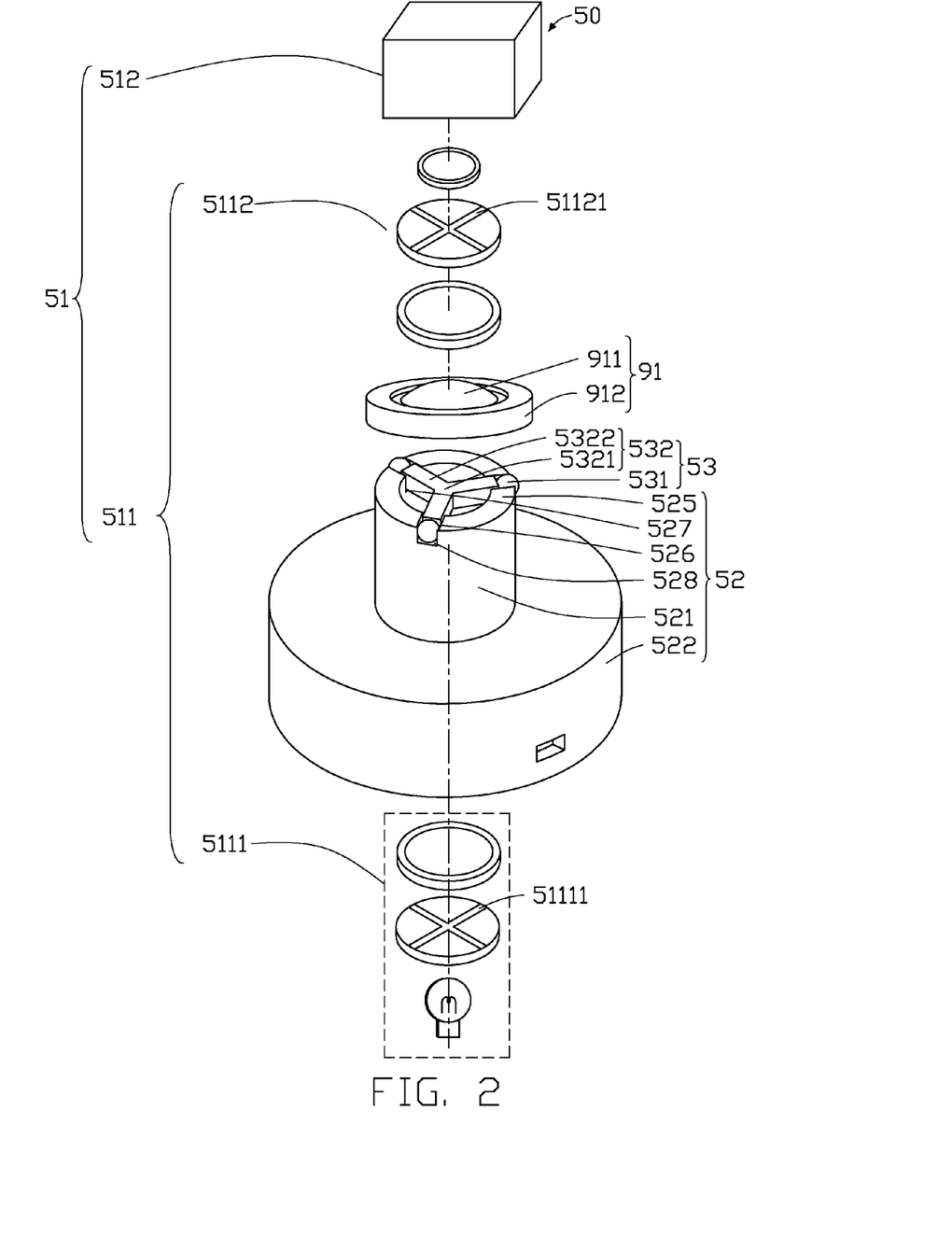
FIG. 2 is an isometric, exploded view of a lens eccentricity detection system of the lens assembly and test apparatus of FIG. 1.
Figure 3:
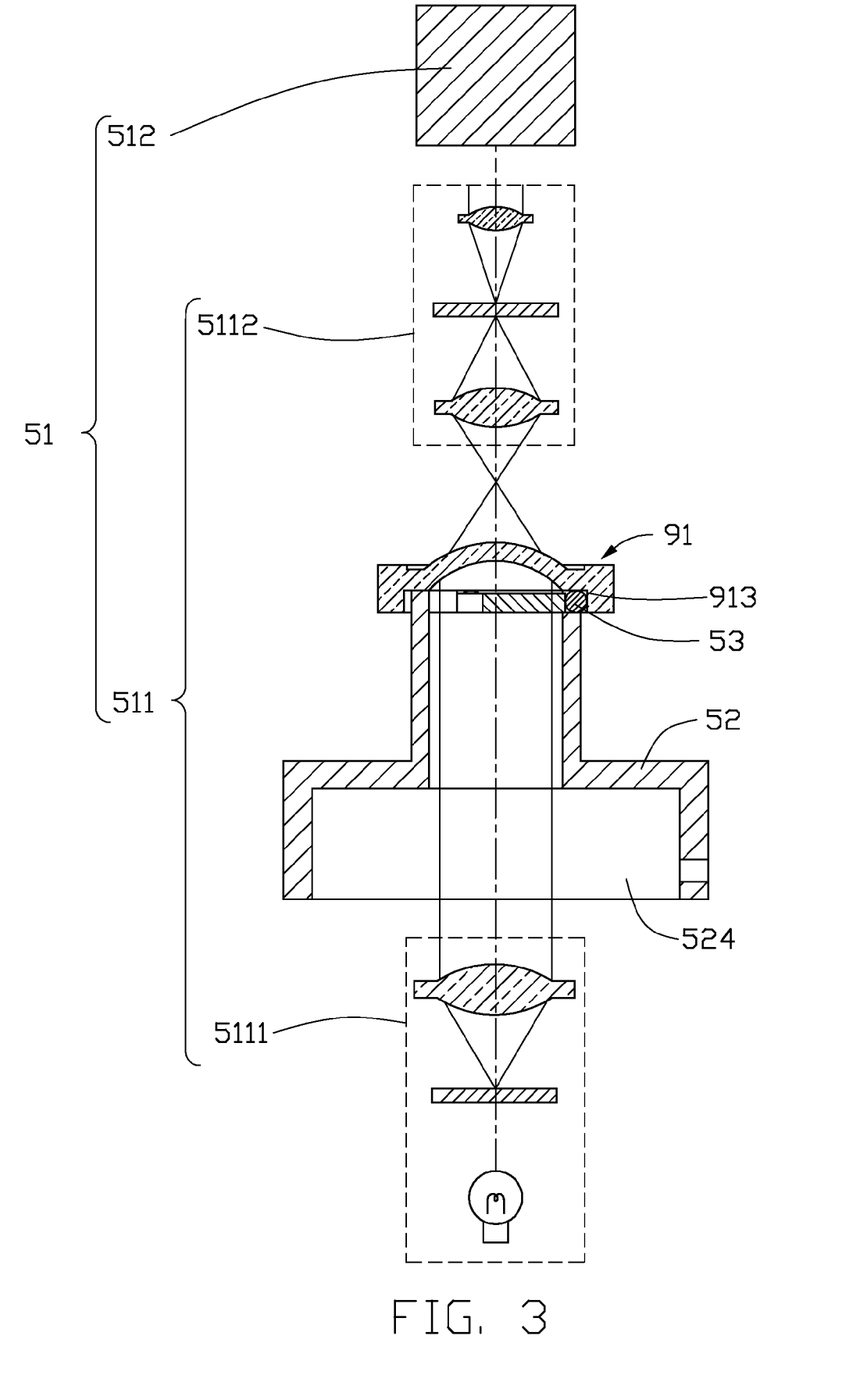
FIG. 3 is a cross-sectional view of the lens eccentricity detection system of FIG. 2.

FIGS. 1-3 illustrate an embodiment of a lens assembly and test apparatus 100, the lens assembly and test apparatus 100 includes a bearing tray 10, a spindle 20, a supporting seat 30, a controller 40, a lens eccentricity detection system 50, a lens assembly device 60, a dispensing device 70 and a resolution detection device 80.

The bearing tray 10 is substantially circular-shaped, which is configured to bear an optic lens 91. The bearing tray 10 includes a first surface 11 and a second surface 12 opposite to the first surface 11. The bearing tray 10 includes a mechanical arm 13 that is used to pick up and place the optic lens 91. One end of the spindle 20 is rotatably connected to the bearing tray 10. Several positioning parts 14 are set on the first surface 11 of the bearing tray 10; the several positioning parts 14 are arranged along a circular arc with a center thereof located in a central axis of the bearing tray 10. In at least one embodiment, the positioning part 14 is a positioning hole. In other embodiments, the number of the positioning part 14 can be changed according to the actual needs.

The lens eccentricity detection system 50 is configured to detect eccentric situation of the optic lens 91. The lens eccentricity detection system 50 includes a detection mechanism 51, a carrying mechanism 52 and an undertaking mechanism 53. The undertaking mechanism 53 is located in the carrying mechanism 52 that is aligned with the detection mechanism 51. The optic lens 91 includes a main body 911 and a perimeter part 912 surround the main body 911.

The detection mechanism 51 is configured to detect eccentricity of the optic lens 91. The detection mechanism 51 includes a microscope unit 511 configured to detect eccentricity of the optic lens 91 and a display 512 configured to display eccentricity of the optic lens 91. The microscope unit 511 can be transmission microscope unit, reflex microscope unit or refraction type microscope unit. In at least one embodiment, the microscope unit 511 is a transmission microscope unit. The microscope unit 511 includes a first lens group 5111 and a second lens group 5112. The optic lens 91 is located between the first lens group 5111 and the second lens group 5112. The first lens group 5111 has a projection ticks 51111. The second lens group 5112 has a correction label 51121.

The display 512 is located upper of the microscope unit 511. The display 512 can display images of the projection ticks 51111 and the correction label 51121 formed by a detection beam. A user can observe and record the positions of the two tags.

The carrying mechanism 52 is substantially prismatic-shaped and is configured to bear the optic lens 91. The carrying mechanism 52 includes a hollow first prism 521 and a second prism 522; the first prism 521 is located on the second prism 522. A radius of the first prism 521 can be smaller than a radius of the second prism 522. The second prism 522 has a house 524 communicated with the first prism 521. The first lens group 5111 is fixed in the house 524. The optic lens 91 is placed on the first prism 521. The first prism 521 includes a bearing surface 525 contacted with the optic lens 91; the bearing surface 525 defines three grooves 526.

The undertaking mechanism 53 is located in the carrying mechanism 52, which is used to rely on the optic lens 91 to avoid the optic lens 91 tilt when rotated. The undertaking mechanism 53 includes three spheres 531 and an elastic element 532. The elastic element 532 is made of elastic transparent material, which haves a central part 5321. The central part 5321 is connected to three strut bars 5322 extending along three directions in a same surface. The three spheres 531 are located in the three grooves 526 respectively. In at least one embodiment, each of the three grooves 526 includes an internal rabbet 527 close to the first prism 521 and an outside rabbet 528 far away the first prism 521. When the optic lens is arranged in the carrying mechanism 52, parts of the three spheres 531 bulge on the outside rabbet 528 abut on a medial wall 913 of the perimeter part 912 of the optic lens 91, thereby avoid the optic lens 91 tilt when rotated.

In at least one embodiment, the optic lens 91 is detected when the optic lens 91 is rotating around a central axis of the main body 911. The eccentricity is an eccentricity between the main body 911 of the optic lens 91 and the central axis of the main body 911.

Figure 4:
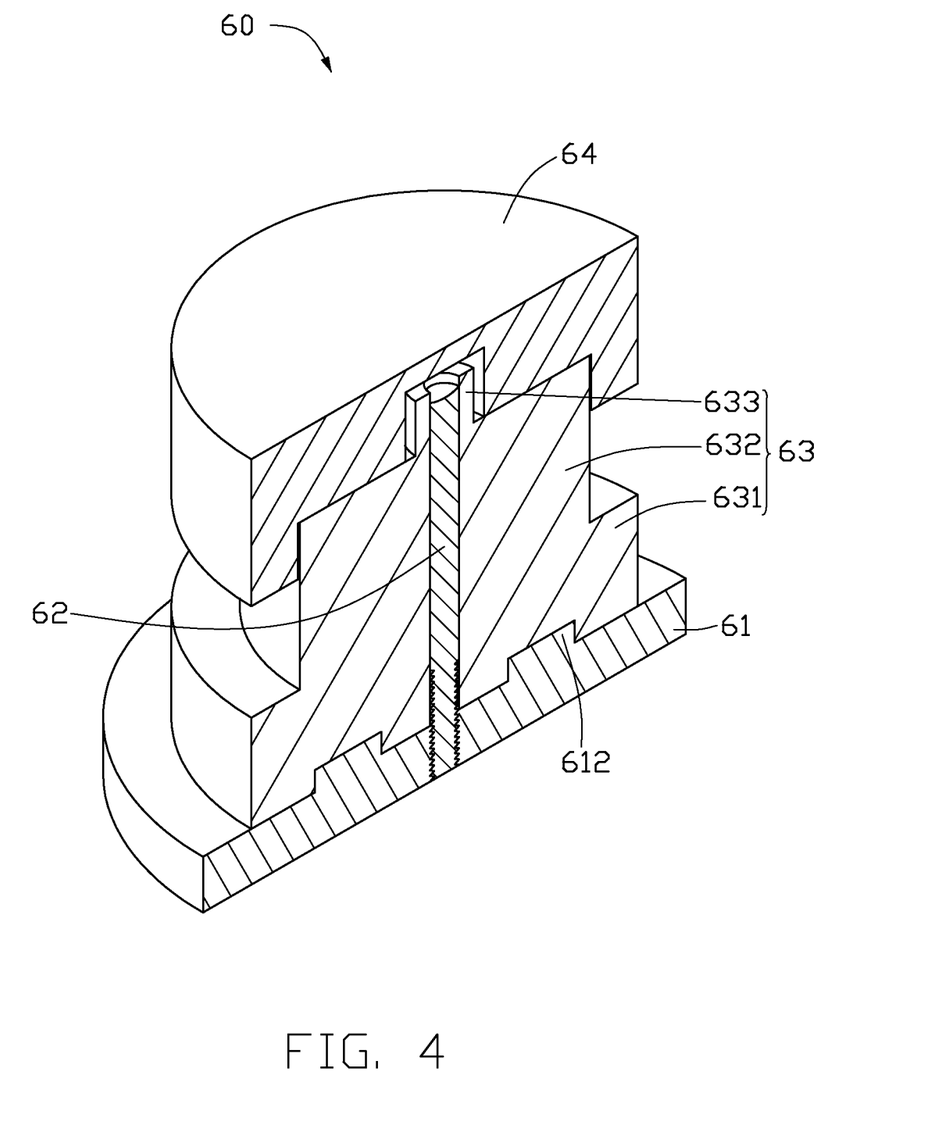
FIG. 4 is a partial cross-sectional view of a lens assembly device of the lens assembly and test apparatus of FIG. 1.
Figure 5:
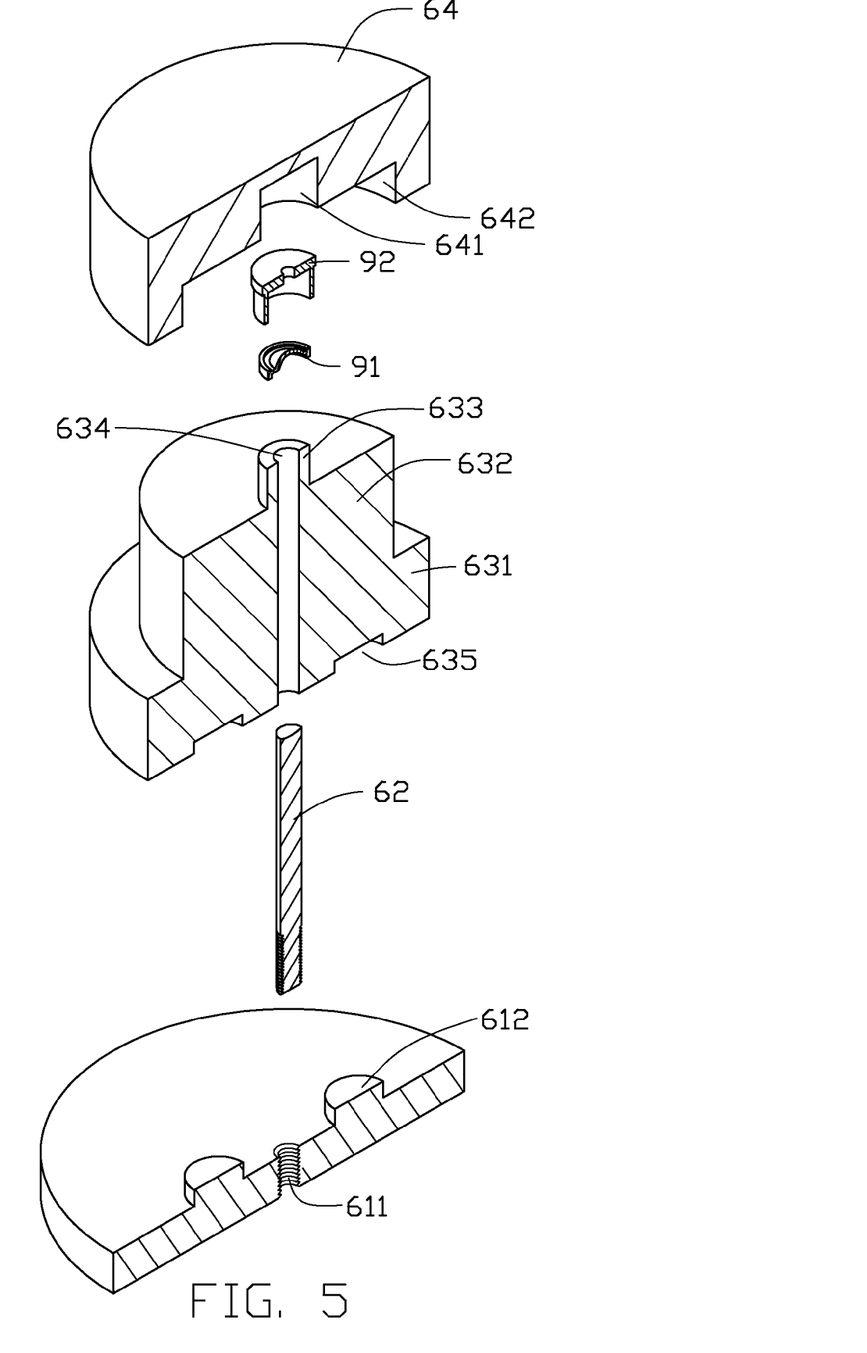
FIG. 5 is another partial cross-sectional view of the lens assembly device of FIG. 4 when the lens assembly device working.

Referring to FIGS. 4-5, the lens assembly device 60 is used to assemble the optic lens 91 to a lens barrel 92. The optic lens 91 has been tested to be qualified by the lens eccentricity detection system 50. The lens assembly device 60 includes a base 61, an assembly bar 62, an assembly table 63 and a pressing cover 64. The base 61 defines a screwed hole 611, and the base 61 includes two positioning masts 612 spaced from each other. The length of the assembly bar 62 is equal or larger than the height of the base 61 and the assembly table 63.

The assembly table 63 includes an assembly bed box 631, a first boss 632 located on the assembly bed box 631 and a second boss 633 located on the first boss 631. The assembly table 63 defines a through hole 634, the assembly bar 62 is coupled to the through hole 634. The assembly table 63 also defines two slots 635 coupled to the two positioning masts 612. The pressing cover 64 defines a first holding hole 641 and a second holding hole 642. The first holding hole 641 is used to couple to the lens barrel 92 to fix the lens barrel 92. The second holding hole 642 is configured to couple to the first boss 632 of the assembly table 63.

One end of the assembly bar 62 extends through the screwed hole 611 of the base 61. The assembly bar 62 and the base 61 forms a screw thread connection. The assembly table 63 is set on the assembly bar 62 through the through hole 634 and is used to make the two slots 635 of the assembly bed box 631 opposite to the two positioning masts 612, respectively. The base 61, the assembly bar 62 and the assembly table 63 are assembled together.

Figure 6:
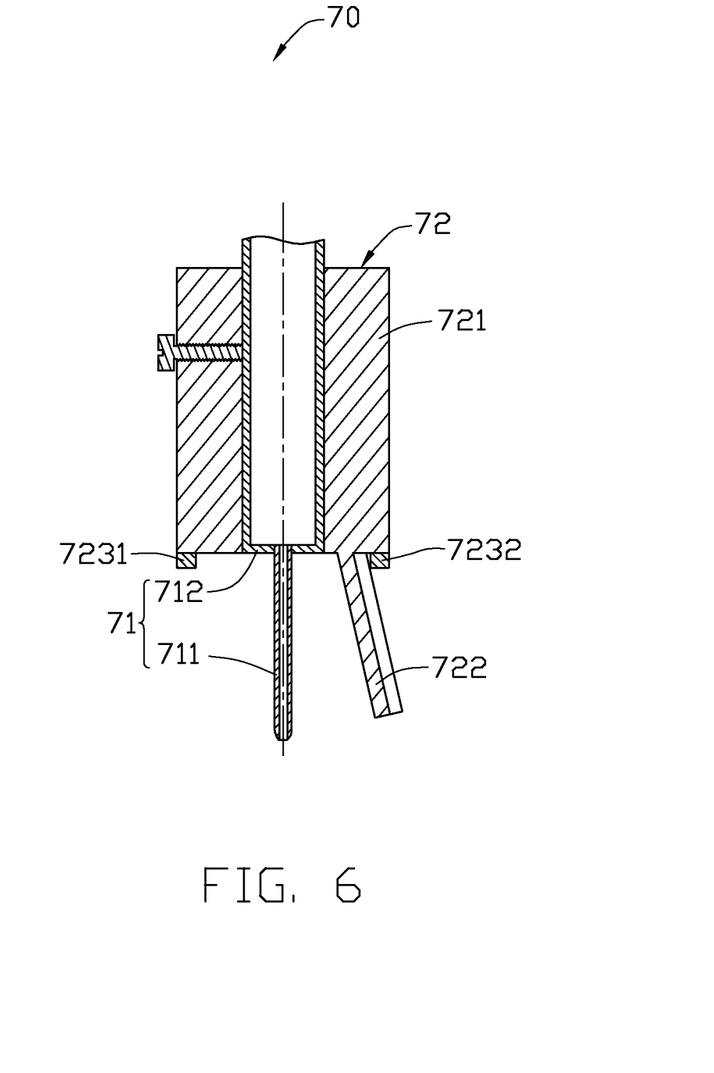
FIG. 6 is a partial, sectional view a dispensing device of the lens assembly and test apparatus of the FIG. 1.
Figure 7:
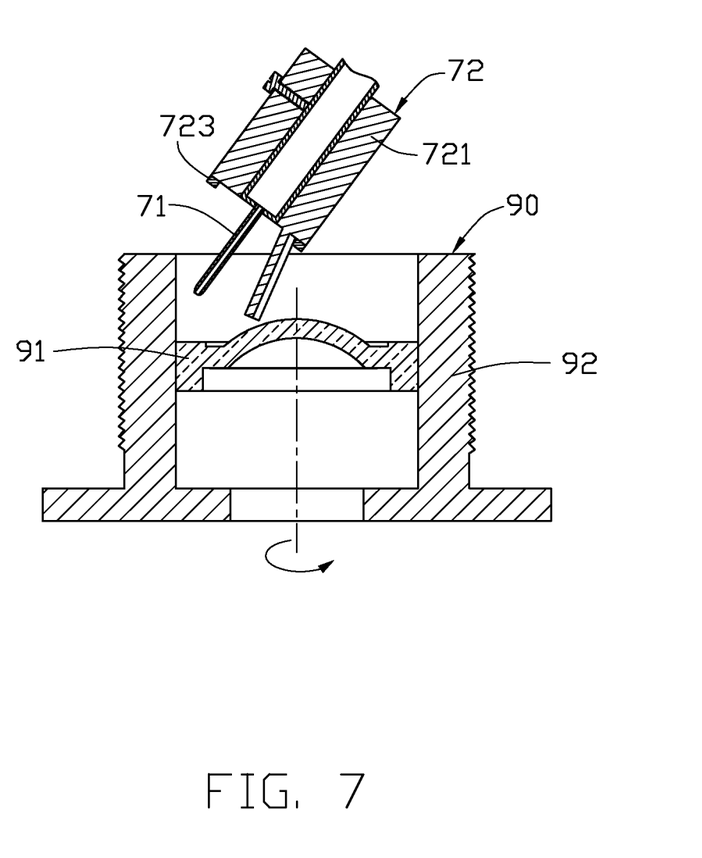
FIG. 7 is a cross-sectional view of the dispensing device of FIG. 6 when the dispensing device working.

Referring to FIGS. 6-7, the dispensing device 70 is used to cement a lens module 90. The dispensing device 70 includes a dispenser 71 and a cylinder box 72 connected to the dispenser 71. The dispenser 71 includes a syringe needle 711 and a work drum 712 connected to the syringe needle 711. The cylinder 72 includes a holder 721, a baffle 722 and a sensing device 723. The baffle 722 is connected to the holder 721. The sensing device 723 includes a first sensor 7231 and a second sensor 7232.

The first sensor 7231 and the second sensor 7232 are arranged on a side wall of the holder 721 close to the syringe needle 711. The first sensor 7231 and the second sensor 7232 are configured to sense a distance between the syringe needle 711 and the dispensing position. The holder 721 is substantially cylindraceous-shaped. In at least one embodiment, the holder 721 is used to house the work drum 712 of the dispenser 71.

The resolution detection device 80 is used to detect the resolution of the lens module 90 after the lens module 90 are cemented by the dispensing apparatus 70 to judge whether the lens module 90 is tightly fitted in the lens barrel 92. The fit condition between the lens module 90 and the lens barrel 92 affects the resolution of the lens module 90. If the resolution of the lens module 90 meets the requirements, the fit condition between the lens module 90 and the lens barrel 92 is suitable. When the lens module 90 is arranged in the resolution detection device 80, and the lens module 90 is used to capture a image of a testing chart of the resolution detection device 80. A processing system of the resolution detection device 80 processes the image of the testing chart to gain the resolution of the lens module 90.

As assembled, one end of the spindle 20 is fixed on the supporting seat 30, and the other one of the spindle 20 is rotatably connected to the bearing tray 10. The mechanical arm 13 is fixed on the first surface 11. The lens eccentricity detection system 50, the lens assembly device 60, the dispensing device 70 and the resolution detection device 80 are arranged along the edge of the bearing tray 10. The lens eccentricity detection system 50, the lens assembly device 60, the dispensing device 70, the resolution detection device 80 and the bearing tray 10 are spaced from each other by a predetermined distance.

In operation, first, the optic lens 91 is set in the carrying mechanism 52 and is rotated. The detection mechanism 52 detects a eccentricity of the optic lens 91 to gain the eccentric situation of the optic lens 91. The first lens group 5111 emits a detection beam. The detection beam passes through the optic lens 91 and the second lens group 5112. The images of the projection ticks 51111 and the correction label 51121 are displayed on the display 512. The image of the projection ticks 51111 must passes through the optic lens 91; the image of the correction label 51121 need not to pass through the optic lens 91. The user compares the positions of the images of the projection ticks 51111 and the correction label 51121 to gain the eccentric situation of the optic lens 91.

Next, the controller 40 controls the mechanical arm 13 to grab the optic lens 91 detected by the lens eccentricity detection system 50 and arrange the optic lens 91 in a corresponding positioning part 14, so that the lens eccentricity detection system 50 can detect the eccentric situation of the next optic lens 91. When the optic lens 91 is positioned in the corresponding positioning part 14, the controller 40 controls the bearing tray 10 to rotate. The bearing tray 10 stop running when the corresponding positioning part 14 is opposite to the lens assembly device 60. The controller 40 controls the mechanical arm 13 to grab the optic lens 91 and arranged in the second boss 633 of the assembly table 63. The pressing cover 64 is pressed on the lens barrel 92 to fix the lens barrel 92. A part of the assembly bar 62 extending off the screwed hole 611 is rotated to adjust the length of the assembly bar 62 in the through hole 634 of the assembly table 63, thereby make a spherical surface of the assembly bar 62 abuts on the optic lens 91 and assembles the optic lens 91 with the lens barrel 92, thus to form a lens module 90.

The controller 40 controls the mechanical arm 13 to grab the lens module 90 and arrange the lens module 90 in another corresponding positioning part 14. When the lens module 90 is positioned in the another corresponding positioning part 14, the controller 40 controls the bearing tray 10 to rotate. The bearing tray 10 stop running when the corresponding positioning part 14 is opposite to the dispensing device 70. The syringe needle 711 of the dispensing device 70 stretches into the lens barrel 92; the syringe needle 711 and the lens barrel 92 are spaced from each other by a predetermined distance. The predetermined distance is used to extrude glue. The baffle 722 is adjacent to the central zone of the lens barrel 92 to avoid the glue be sprayed on the central zone of the optic lens 91. The first sensor 7231 detects a distance between the syringe needle 711 and the lens barrel 92; the second sensor 7232 detects a distance between the optic lens 91 and the syringe needle 711. The dispensing device 70 compares the distance with a standard values and adjusts the position of the syringe 711. The dispensing device 70 sprays glue to the dispensing position when the lens module 90 is in rotating. The syringe needle 711 of the dispensing device 70 is removed from the lens barrel 92, and dispensing operation is completed.

The controller 40 controls the bearing tray 10 to rotate. When the positioning part which the lens module 90 is set in is opposite to the resolution detection device 80, the bearing tray 10 stop running The controller 40 controls the mechanical arm 13 to grab the lens module 90 and arrange the lens module 90 in the resolution detection device 80. The resolution detection device 80 detects the resolution of the lens module 90.

The embodiments shown and described above are only examples. Many details are often found in the art such as the other features of a lens assembly and test apparatus. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size and arrangement of the parts within the principles of the present disclosure up to, and including the full extent established by the broad general meaning of the terms used in the claims. It will therefore be appreciated that the embodiments described above may be modified within the scope of the claims.

What is claimed is:

1. A lens assembly and test apparatus comprising:
    a bearing tray comprising a mechanical arm;
    a controller configured to control the bearing tray and the mechanical arm,
    so that the mechanical arm grabs an optic lens;
    a lens eccentricity detection system arranged along the edge of the bearing tray;
    a lens assembly device arranged along the edge of the bearing tray; a dispensing device arranged along the edge of the bearing tray; and
    a resolution detection device arranged along the edge of the bearing tray;
    wherein the controller is further configured to cause the mechanical arm to arrange the optic lens in the lens eccentricity detection system and the lens assembly device in sequence,
    the lens eccentricity detection system is configured to detect the optic lens, and
    the lens assembly device is configured to assemble the optic lens into a lens barrel to form a lens module;
    the controller is further configured to control the mechanical arm to grab the lens module and arrange the lens module in the dispensing device and the resolution detection device in sequence;
    wherein the dispensing device is configured to cement the lens module, and
    the resolution detection device is configured to detect the resolution of the lens module.

2. The lens assembly and test apparatus of claim 1, wherein the bearing tray is used to bear the optic lens or the lens module.

3. The lens assembly and test apparatus of claim 2, wherein the mechanical arm is used to pickup and place the optic lens or the lens module.

4. The lens assembly and test apparatus of claim 3, further comprising several positioning parts set on the bearing tray to house the optic lens or the lens module.

5. The lens assembly and test apparatus of claim 4, wherein the several positioning parts are arranged along a circular arc with a center thereof located in a central axis of the bearing tray.

6. The lens assembly and test apparatus of claim 1, wherein the lens eccentricity detection system, the lens assembly device, the dispensing device, the resolution detection device and the bearing tray are spaced from each other by a predetermined distance.

7. The lens assembly and test apparatus of claim 6, wherein the lens assembly and test apparatus comprises a spindle and a supporting seat, one end of the spindle is fixed on the supporting seat, the other one of the spindle is rotatably connected to the bearing tray.

8. The lens assembly and test apparatus of claim 4, wherein the positioning parts are positioning holes.

* * * * *